United States Patent
Koga et al.

(10) Patent No.: US 6,872,915 B2
(45) Date of Patent: Mar. 29, 2005

(54) HIGH SPEED CARBON DIOXIDE GAS WELDING METHOD

(75) Inventors: Yasuhiro Koga, Kitakyushu (JP); Shinji Okumura, Kitakyushu (JP); Haruki Nakashima, Kitakyushu (JP); Hiroyuki Handa, Kitakyushu (JP); Takahide Hirayama, Kitakyushu (JP)

(73) Assignee: Kabushiki Kaisha Yaskawa Denki, Kitakyushu (JP)

(*) Notice: Subject to any disclaimer, the term of this patent is extended or adjusted under 35 U.S.C. 154(b) by 0 days.

(21) Appl. No.: 10/204,436

(22) PCT Filed: Mar. 1, 2001

(86) PCT No.: PCT/JP01/01572

§ 371 (c)(1), (2), (4) Date: Aug. 30, 2002

(87) PCT Pub. No.: WO01/64382

PCT Pub. Date: Sep. 7, 2001

(65) Prior Publication Data

US 2003/0042238 A1 Mar. 6, 2003

(30) Foreign Application Priority Data

Mar. 1, 2000 (JP) .......................... 2000-056229

(51) Int. Cl.⁷ ............................................. B23K 9/10
(52) U.S. Cl. .......................... 219/137 PS; 219/130.5
(58) Field of Search ............... 219/137 PS, 130.21, 219/130.31, 130.32, 130.33, 74, 137 WM, 130.5

(56) References Cited

U.S. PATENT DOCUMENTS 4,889,969 A * 12/1989 Kawai et al. ........... 219/130.21
5,095,191 A * 3/1992 Bushey et al. ...... 219/137 WM

FOREIGN PATENT DOCUMENTS

| JP | 63-20183 | 1/1988 |
| JP | 3-193269 | 8/1991 |
| JP | 2000-317677 | 11/2000 |

* cited by examiner

Primary Examiner—Clifford C. Shaw
(74) Attorney, Agent, or Firm—Westerman, Hattori, Daniels & Adrian, LLP

(57) ABSTRACT

An arc welding method which suppresses sputtering and which makes it possible to obtain a smooth bead penetration surface shape as in MIG or MAG welding, without producing undercuts or bumping beads. A carbon dioxide gas welding method effecting welding at welding rates of about not less than 1.5 m/minute using a consumable electrode and a welding power source having a control means for opening a short circuit at a rate of at least about 500 A/msec on detection of such short circuit, wherein welding is effected with a proper volume of globules under the welding conditions obtained by computing a welding voltage corresponding to the proper volume of globules by a first formula representing the relationship between the welding wire feed rate, the welding voltage and the volume of globules traveling to a pond of weld as the welding wire is melting and a second formula representing the relationship between the wire feed rate, the welding voltage, and the period of globules traveling to a pond of weld as the welding wire is melting.

7 Claims, 9 Drawing Sheets

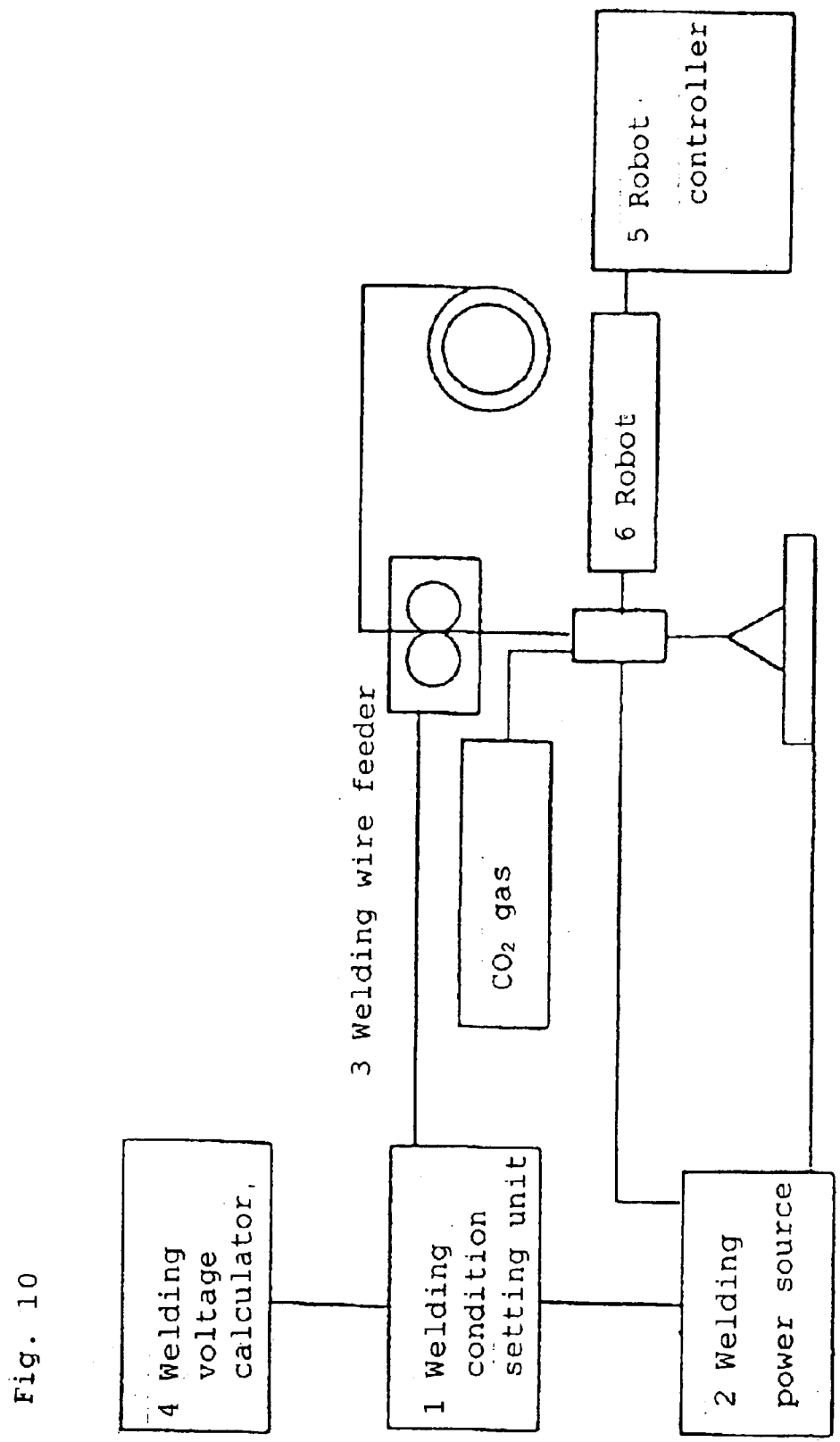

HIGH SPEED CARBON DIOXIDE GAS WELDING METHOD

TECHNICAL FIELD

The present invention relates to a carbon dioxide gas arc welding method and, in particular, to a high-speed carbon dioxide gas arc welding method for high-speed welding at a rate of approximately 1.5 m/minute or more (in a region having a voltage higher than that of a buried arc region, a humping region, and a fusing region, traveling of globules occurs in a nearly fixed fashion involving virtually no short circuit) using a power source having a control means for opening a short circuit at a rate of at least approximately 500 A/msec based on detection of such a short circuit.

BACKGROUND ART

In carbon dioxide gas welding, a shielding gas is $CO_2$ and since the electrical gradient plasma is a great, arcing tends to occur from a point with the shortest possible distance, thus such arcing points concentrate in the vicinity of the lower portion of globules. Consequently, current density of the arc column is heightened and arcing results in a firm slender shape. Because of the concentration of arcing points, the arcing force is applied in a direction where departure of globules is blocked, causing a phenomenon where globules are pushed back to the wire upside, therefore, a short circuit transfer of globules occurs in a relatively low-current region, an increase in current does not result in a spray transfer as in inert gas shielded arc welding but merely results in extremely large globules and short circuit transfer and globular transfer exist in a mixed fashion. As a result, arcing stability is lost and spatters frequently occur.

High-speed carbon dioxide gas welding where welding is carried out while increasing the welding rate from the order of 1 m/minute results in high-speed large-current welding, and effects of an electromagnetic pressure caused by electromagnetic force of arcing itself become considerable, influences thereof are also reflected in bead formation, the surface of a pond of weld receives the effects and is thus depressed, whereby a gauging head region where the bottom portion of the pond of weld or the peripheral portion thereof is exposed is formed. Furthermore, a problem exists such that, when effects of arc pressure become strong, namely, when a large current occurs, the gauging region is expanded, and finally, solidification proceeds before the region has been sufficiently buried by the exposed portion, whereby undercuts of humping beads are produced.

In order to solve such problems of high-speed welding, it is generally considered that employment of a buried arc method with a voltage lower than its original welding voltage and a shortened arc length is effective in suppression of occurrence of large-sized spatters and in suppression of undercuts and humping beads.

As in the above, according to the prior art, in high-speed carbon dioxide gas welding at a rate of approximately 1.5 m/minute or more, employment of a buried arc method with a shortened arc length can suppress occurrence of large-sized spatters to some extent, whereas the arc heat source is buried inside the surface of the base metal, resulting in deep penetration. In addition, since the welding rate is high and the welding current is great, the aforementioned gauging region is expanded, solidification progresses at the peripheral portion of the pond of weld, undercuts and humping beads are produced, and, as shown in FIG. 8, the penetration shape of a welded joint part results in a shape (a shape like a mushroom) which is slender and deep at the depths of penetration, is of a convex bead widening at the bead surface portion, and has a narrow part therebetween, therefore, it is possible to obtain a smooth bead penetration surface shape as in MAG welding and a problem concerning welding quality that may remarkably deteriorate notch toughness of the joint part has existed.

Therefore, it is an object of the present invention to solve the aforementioned problems and to provide, in high-speed carbon dioxide gas welding at a rate of approximately 1.5 m/minute or more, an arc welding method which suppresses spattering by employing not a buried arc method with a shortened arc length but an open arc method for traveling of globules with a proper volume of globules and which makes it possible, without producing undercuts or humping beads, to obtain a smooth bead penetration surface shape as in MIG or MAG welding.

DISCLOSURE OF THE INVENTION

In order to solve the above problems, a first aspect of the present invention provides a high-speed carbon dioxide gas welding method by a consumable electrode which carries out welding at a welding rate of approximately 1.5 m/minute or more using a welding power source having a control means for opening a short circuit at a rate of at least approximately 500 A/msec based on detection of such a short circuit, wherein welding is carried out with a proper volume of globules under welding conditions obtained by computing a welding voltage corresponding to the proper volume of globules by a formula; representing the relationship between the welding wire feed rate, welding voltage, and volume of globules traveling to a pond of weld as the welding wire melts and a formula; representing the relationship between the wire feed rate, welding voltage, and period of globules traveling to a pond of weld as the welding wire melts.

A second aspect of the present invention provides a high-speed carbon dioxide gas welding method as set forth in the first aspect, wherein when a welding voltage corresponding to the proper volume of globules is computed by a formula representing the relationship between the wire feed rate, welding voltage, and volume of globules and a formula representing the relationship between the wire feed rate, welding voltage, and period of globules, a welding wire having a diameter of 1.2 mm is used, the volume of globules is in a range of 3.0 $mm^3$–4.5 $mm^3$, and the traveling period of globules is in a range of 9 msec–12 msec.

A third aspect of the present invention provides a high-speed carbon dioxide gas welding method as set forth in the first aspect, wherein when a welding voltage (Vw) corresponding to the proper volume of globules is computed by a formula representing the relationship between the wire feed rate, welding voltage, and volume of globules and a formula representing the relationship between the wire feed rate, welding voltage, and period of globules, a welding wire having a diameter of 1.2 mm is used, the volume of globules (W) is in a range of 3.0 $mm^3$–4.5 $mm^3$, and the traveling period of globules (Td) is in a range of 9 msec–15 msec, the welding rate is approximately 2.0–2.5 m/minute, and the welding wire feed rate (Vf) is in a range of 15 m/minute–20 m/minute, a welding voltage is computed by formulae:

$$W=(\alpha1*Vf+\alpha2)*Vw+\alpha3*Vf+\alpha4$$

$$Td=(\alpha5*Vf+\alpha6)*Vw+\alpha7*Vf+\alpha8$$

($\alpha1$, $\alpha2$, $\alpha3$, $\alpha4$, $\alpha5$, $\alpha6$, $\alpha7$, and $\alpha8$ are constants.)

A fourth aspect of the present invention provides a high-speed carbon dioxide gas welding method as set forth in the first aspect, wherein when a welding voltage corresponding to the proper volume of globules is computed by a formula representing the relationship between the wire feed rate, welding voltage, and volume of globules and a formula representing the relationship between the wire feed rate, welding voltage, and period of globules, a buried arc region where arcing occurs inside a pond of weld and a region where a base metal is broken or welding is not stabilized are determined through experimentation in advance.

A fifth aspect of the present invention provides a high-speed carbon dioxide gas welding method as set forth in the fourth aspect, wherein where a welding wire having a diameter of 1.2 mm is used, the welding rate is approximately 2.5 m/minute, the welding wire feed rate (Vf) is in a range of 18 m/minute–20 m/minute, the volume of globules (W) is in a range of 3.0 mm$^3$–4.5 mm$^3$, and the traveling period of globules (Td) is in a range of 9 msec–12 msec, when a welding voltage (Vw) is computed with an input of the welding wire feed rate and welding rate so that the volume of globules becomes nearly stable, a welding voltage is computed by formulae:

$$W=(-0.0243*Vf+0.4029)*Vw+1.1548*Vf-15.885$$

$$Td=(-0.0591*Vf+0.9634)*Vw+2.3245*Vf-27.329$$

A sixth aspect of the present invention provides a high-speed carbon dioxide gas welding method as set forth in the fourth aspect, wherein where a welding wire having a diameter of 1.2 mm is used, the welding rate is approximately 2 m/minute, the welding wire feed rate (Vf) is in a range of 15 m/minute–17 m/minute, the volume of globules (W) is in a range of 3.0 mm$^3$–4.5 mm$^3$, and the traveling period of globules (Td) is in a range of 10 msec–15 msec, when a welding voltage (Vw) is computed with an input of the welding wire feed rate and welding rate so that the volume of globules becomes nearly stable, a welding voltage is computed by formulae:

$$W=(-0.0326*Vf+0.48)*Vw+1.1273*Vf-12.698$$

$$Td=(-0.1*Vf+1.4661)*Vw+2.646*Vf-24.736$$

A seventh aspect of the present invention provides a high-speed carbon dioxide gas welding method as set forth in any of the first through sixth aspects, wherein welding is carried out by welding equipment including a robot controller.

BRIEF DESCRIPTION OF THE DRAWINGS

FIG. 10 is a block diagram showing a configuration of welding equipment including a robot controller according to the present invention.

BEST MODE FOR CARRYING OUT THE INVENTION

Figure 4:
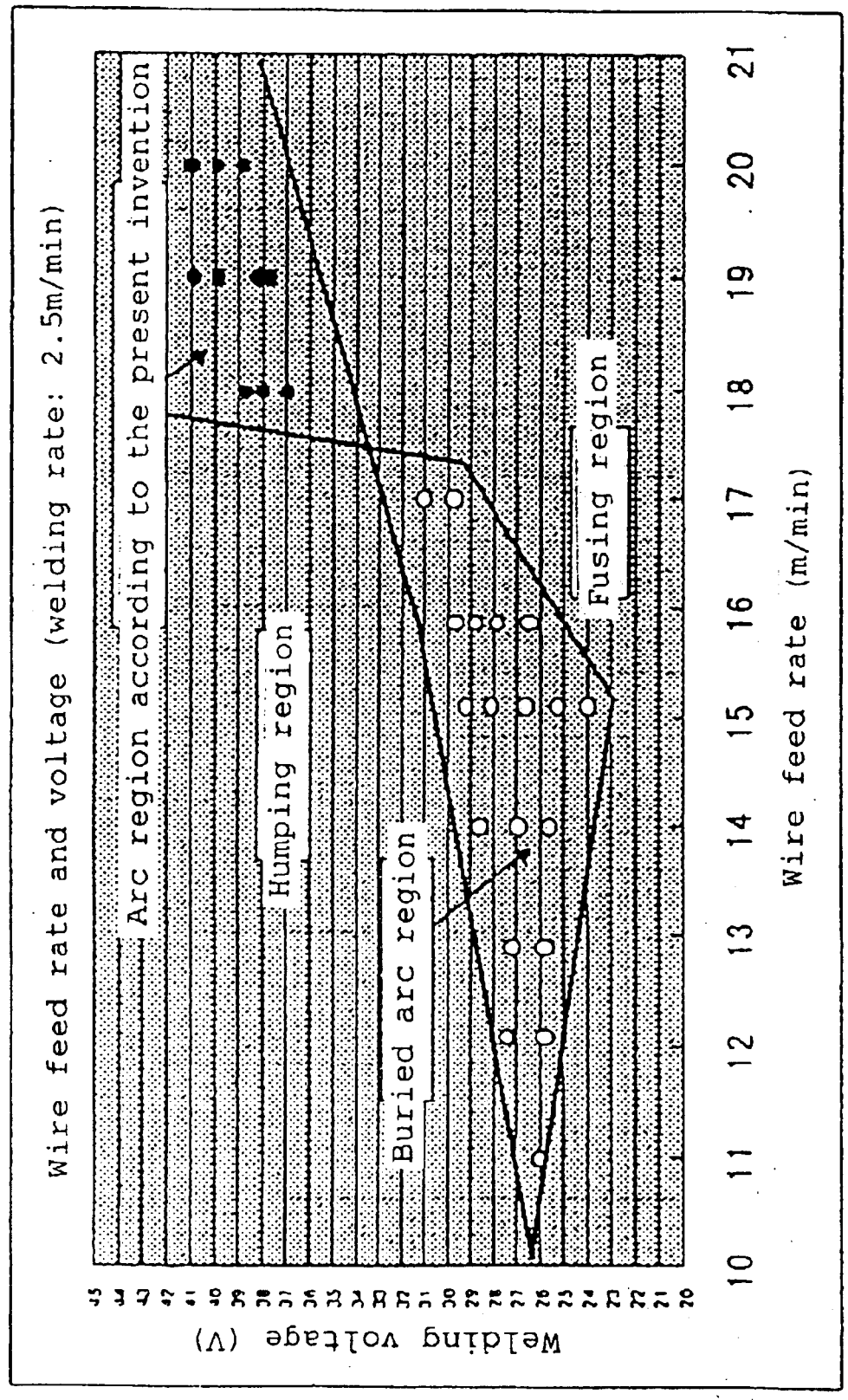
FIG. 4 is a graph showing a buried arc region, a humping region, and a breaking region with a welding rate of 2.5 m/minute according to the present invention.

Hereinafter, a mode for carrying out the present invention will be described in detail based on a first embodiment shown in the drawings. FIG. 4 is a high-speed gas welding region expressed by the welding wire feed rate and welding voltage with a welding rate of 2.5 m/minute in the present invention.

Figure 1:
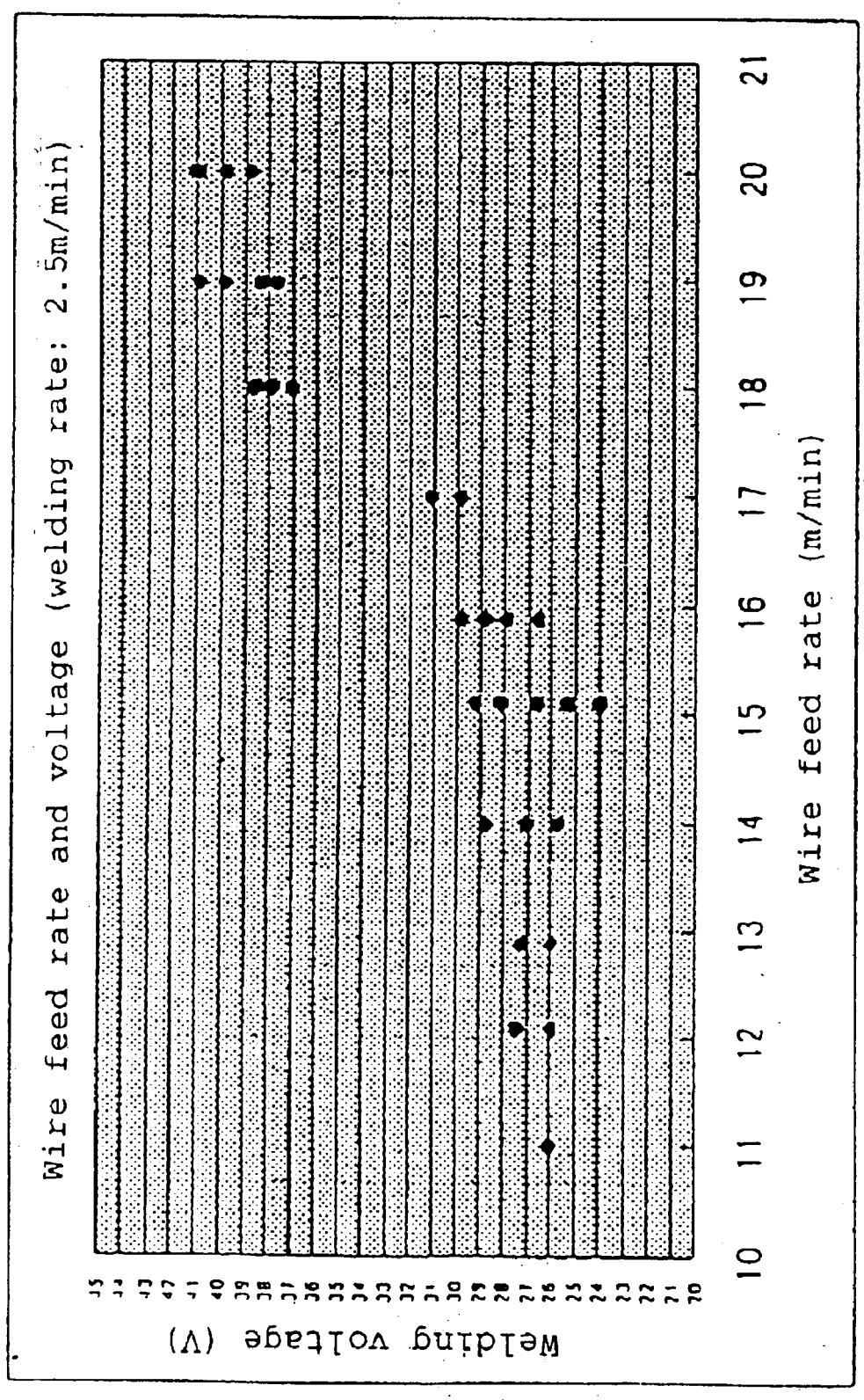
FIG. 1 is a graph showing a stable welding region with a welding rate of 2.5 m/minute according to the present invention.
Figure 2:
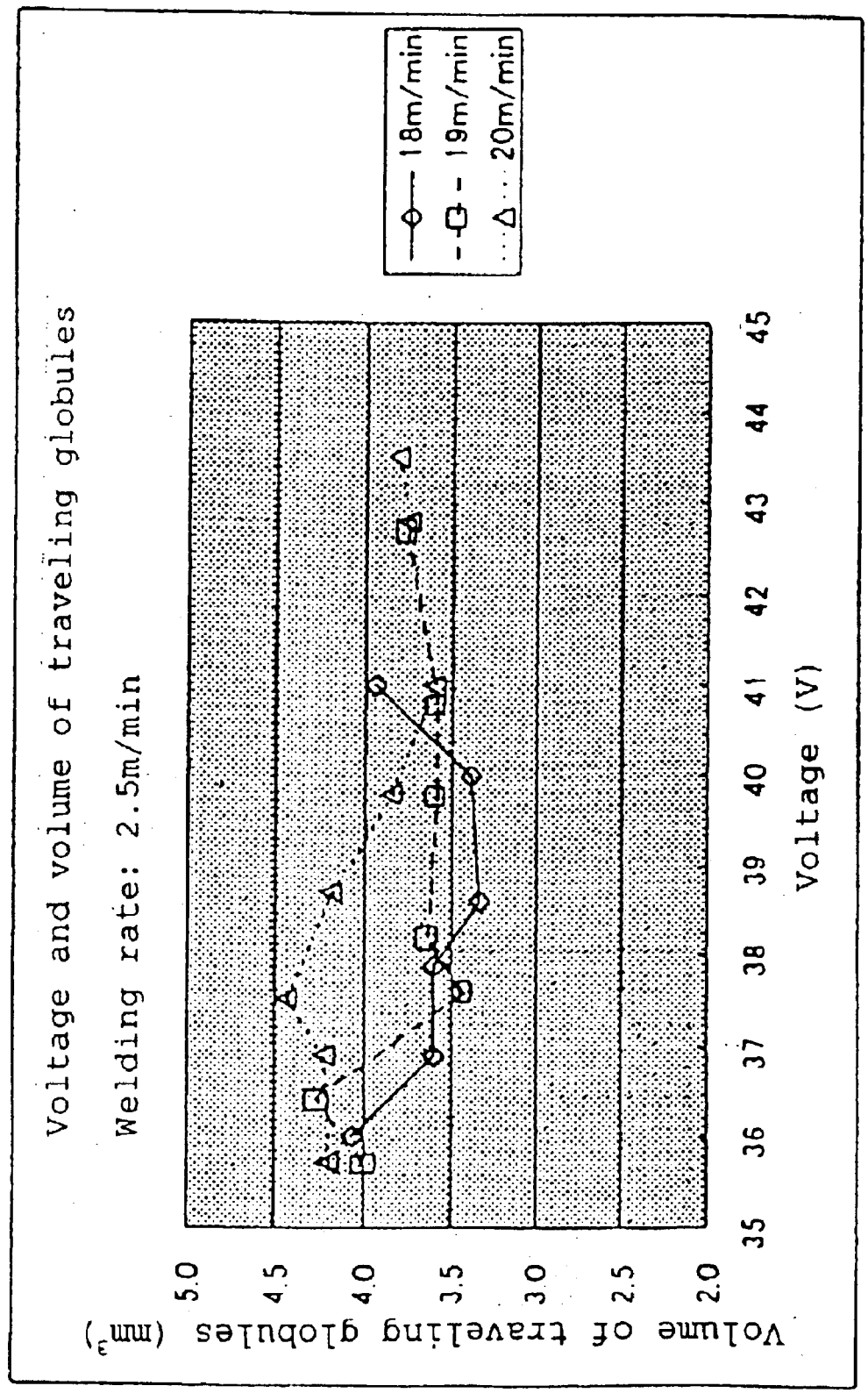
FIG. 2 is a graph showing a relationship between the welding voltage and volume of traveling globules with a welding rate of 2.5 m/minute according to the present invention.

FIG. 2 is a diagram showing a relationship between the welding voltage and volume of traveling globules with a welding rate of 2.5 m/minute according to the present invention.

Figure 3:
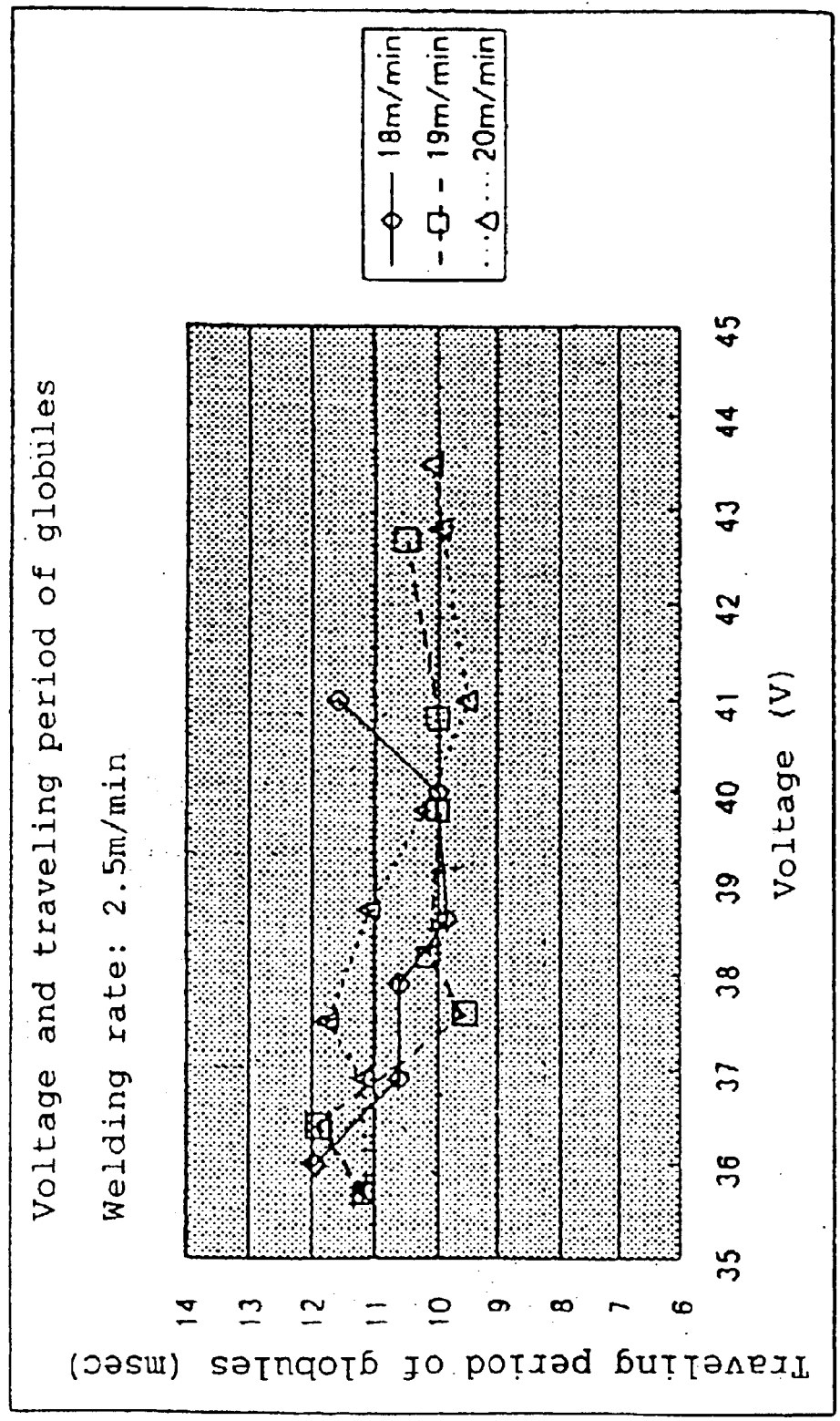
FIG. 3 is a graph showing a relationship between the welding voltage and traveling period of globules with a welding rate of 2.5 m/minute according to the present invention.

FIG. 3 is a diagram showing a relationship between the welding voltage and traveling period of globules with a welding rate of 2.5 m/minute according to the present invention.

FIG. 4 is a diagram showing a welding region of the present invention, a buried arc region, a humping region, and a breaking region with a welding rate of 2.5 m/minute.

Figure 5:
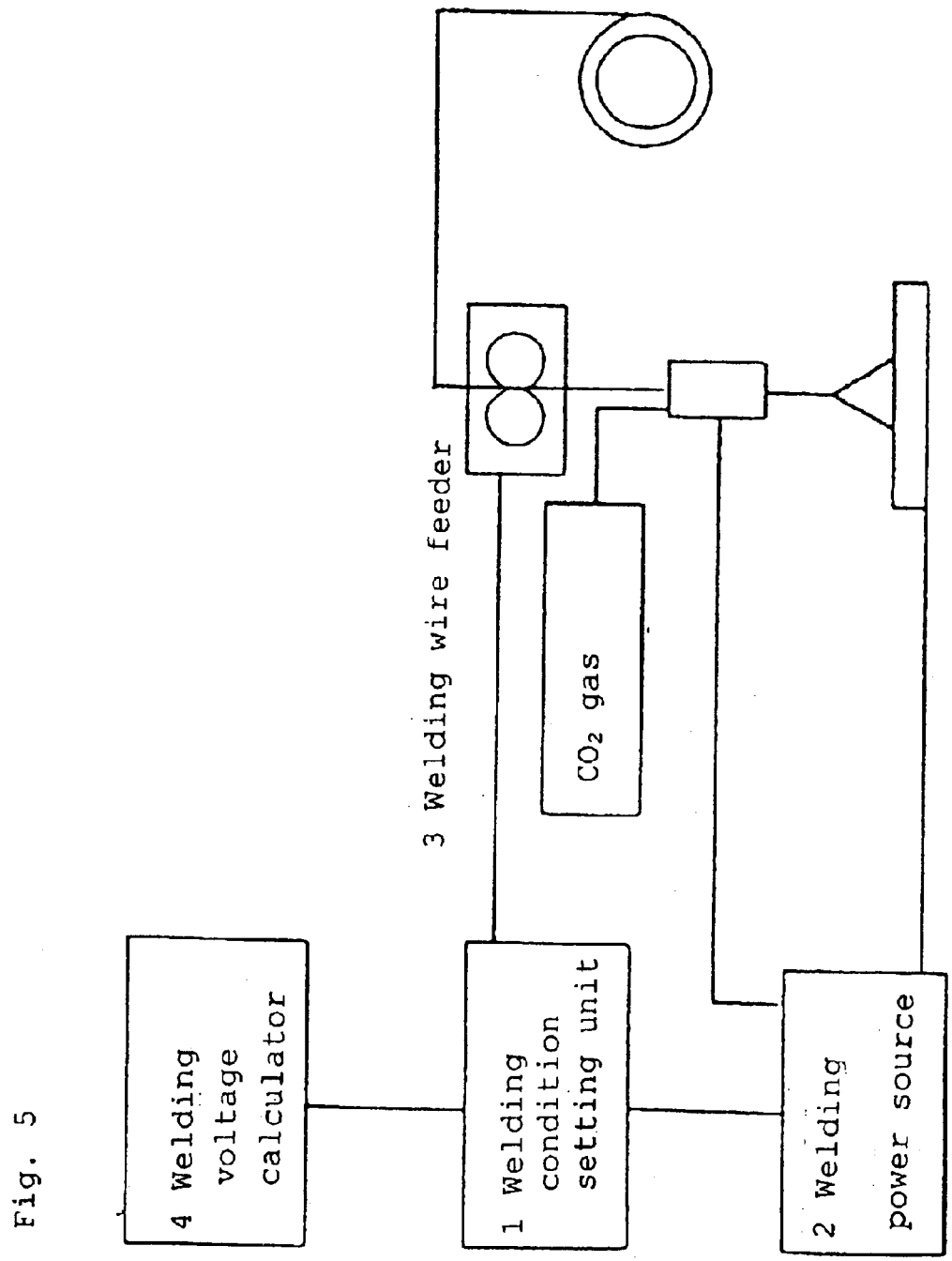
FIG. 5 is a block diagram showing a configuration of welding equipment according to the present invention.

FIG. 5 is welding equipment for carrying out the method according to the present invention, wherein 1 denotes a welding condition setting unit, 2 denotes a power source having a control means for opening a short circuit at a rate of at least approximately 500 A/msec based on detection of such a short circuit, 3 denotes a welding wire feeder, and 4 denotes a welding voltage calculator, which computes a welding voltage corresponding to a proper volume of globules.

Figure 6:
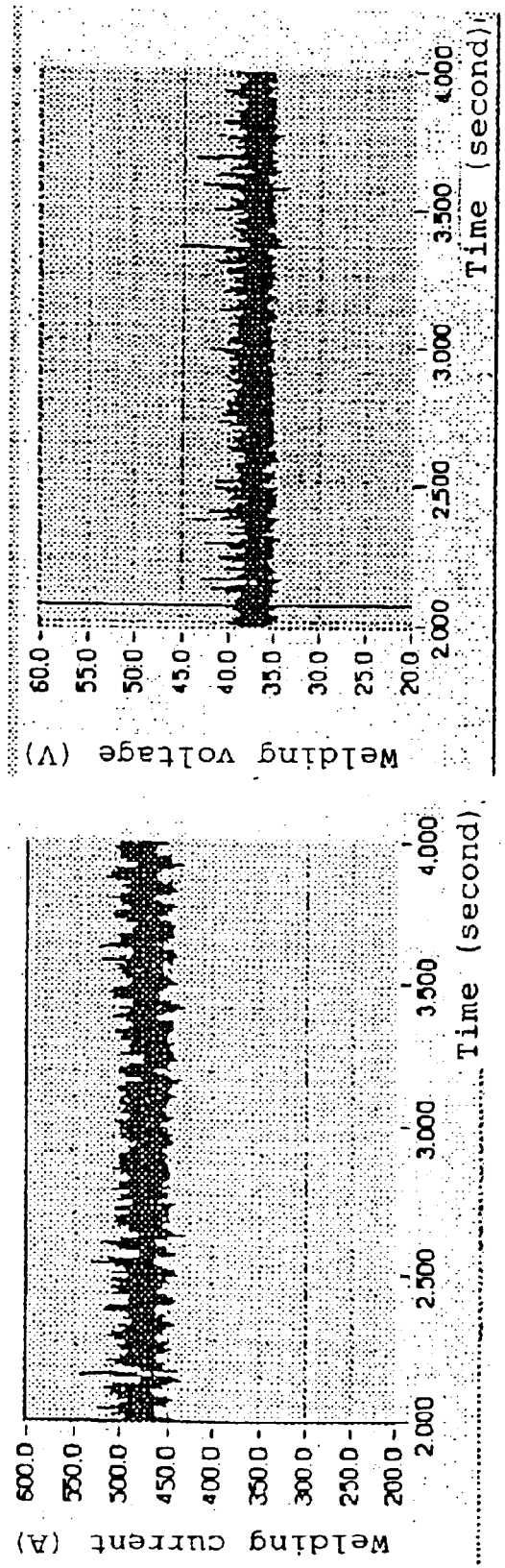
FIG. 6 are charts of a current waveform and a voltage waveform according to the present invention.
Figure 7:
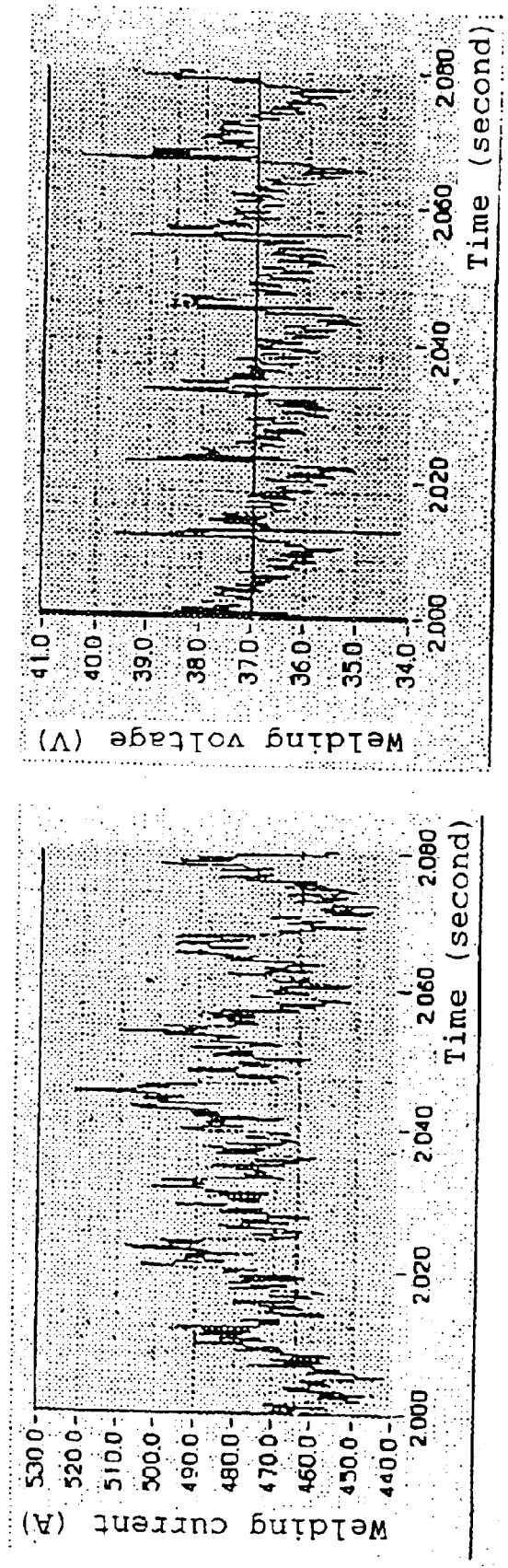
FIG. 7 are (enlarged) charts of a current waveform and a voltage waveform according to the present invention.

First, traveling of globules according to the present invention will be described. As shown in FIG. 2, it can be judged that the volume of globules which depart from the front end of a welding wire and travel to a base metal is specified within a certain range irrespective of the wire feed rate. In addition, as shown in FIG. 3, the traveling period of globules is also specified within a certain range. FIG. 6 are waveforms of welding current and welding voltage in welding according to the present invention (FIG. 7 are enlarged charts), and it is judged that virtually no short circuit having a long departing time of globules has occurred. In short, globules formed on the front end of the welding wire are hardly short-circuited to the base metal and travel in a nearly fixed period as shown in FIG. 7, indicating that stable welding is carried out.

Hereinafter, a case where welding is actually carried out will be described. A welding rate and a welding wire feed rate for carrying out desirable welding are selected, and a welding voltage corresponding to a proper volume of globules is computed by the welding voltage calculator 4. The welding wire feed rate and welding rate, and the welding voltage determined by computing are set in the welding condition setting unit 1 and welding is started. Carbon dioxide gas is used as a shielding gas. In accordance with the set welding wire feed rate, the welding wire feeder 3 feeds a welding wire to a base metal, in accordance with the set welding voltage, the welding power source 2 produces arcing between the welding wire and base metal, and in accordance with the set welding rate, a welding torch shifter (unillustrated) shifts a welding torch, thus welding is carried out. After growing to a proper volume corresponding to the wire feed rate and welding voltage (after the elapse of a proper period), globules depart based on a primary factor of an electromagnetic pinching force applied to the globules and travel to a pond of weld.

Figure 8:
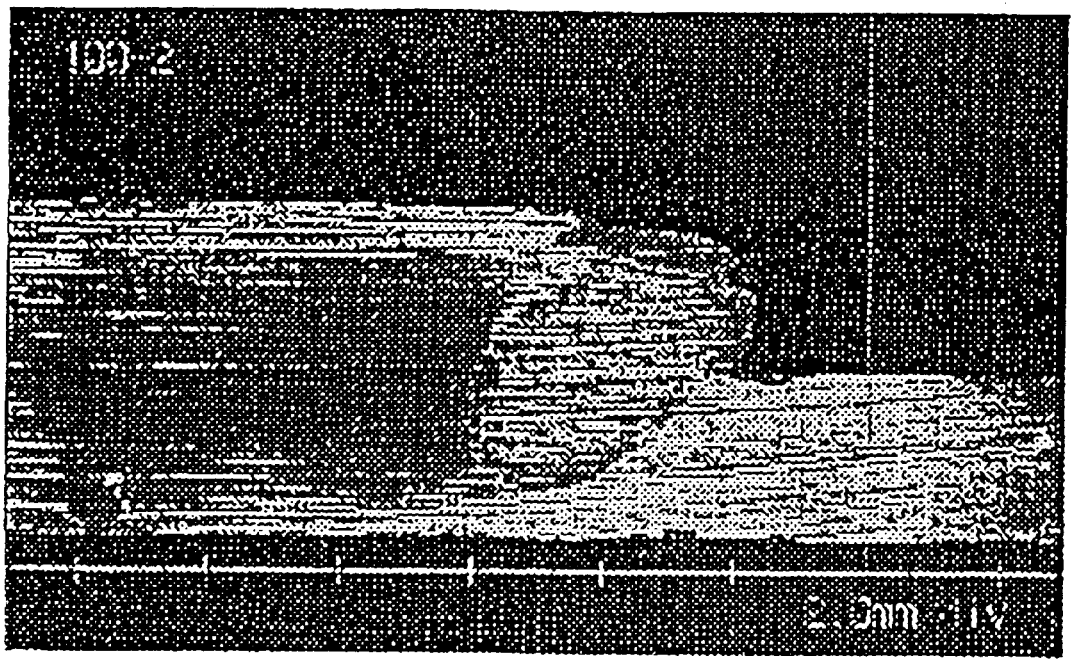
FIG. 8 is an explanatory diagram of a bead penetration shape with a welding rate of 2.5 m/minute according to the prior art.
Figure 9:
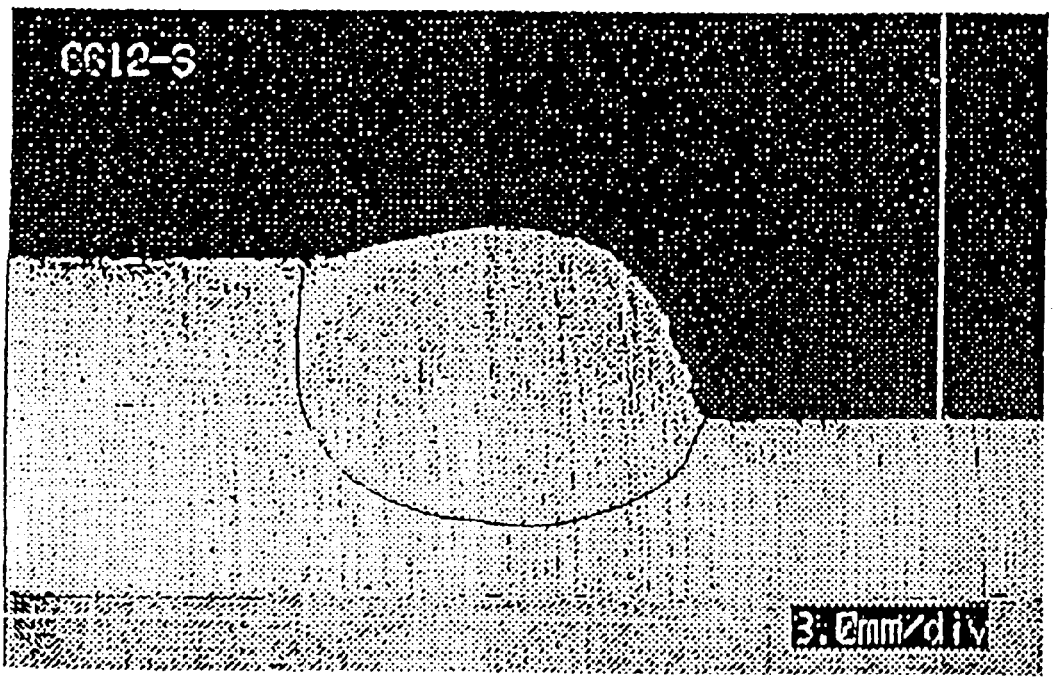
FIG. 9 is an explanatory diagram of a bead penetration shape with a welding rate of 2.5 m/minute according to the present invention.

As such, by repeating formation of globules and a departure in a proper period, stable welding is realized. In addition, the arc mode is open arc welding, the melting position of the wire front end is located on the base metal surface, and the arc is expanded, therefore, the width of penetration becomes wide and the penetration becomes shallow as heat input into the base metal is dispersed. Thereby, even in welding at a welding rate of approximately 1.5 m/minute or more, if the welding method according to the present invention is used, spattering can be suppressed as traveling of globules is stabilized, consequently it becomes possible to obtain a smooth bead penetration surface shape as in MIG or MAG welding, without producing undercuts or humping beads and with a wide penetration width and shallow penetration. A bead penetration shape according to the prior art with a welding rate of 2.5 m/minute is shown in FIG. 8. A bead penetration shape according to the present invention is shown in FIG. 9.

Now, a second embodiment will be described. Based on the first embodiment, a welding wire having a welding wire diameter of 1.2 mm is used, the value of a proper volume of globules is in a range of 3.0 mm$^3$–4.5 mm$^3$, the traveling period of globules is in an range of 9 msec–12 msec, a welding voltage is computed by a formula representing the relationship between the welding wire feed rate, welding voltage, and volume of globules and a formula representing the relationship between the wire feed rate, welding voltage, and traveling period of globules, thus welding is carried out.

Now, a third embodiment will be described. Based on the first embodiment, if the welding rate is 2.5 m/minute, the welding wire feed rate is in a range of 15–20 m/minute, the volume of globules is in a range of 3.0 mm$^3$–4.5 mm$^3$, and the traveling period of globules is in a range of 9 msec–15 msec, where the volume of globules is expressed as w(mm$^3$), the traveling period of globules is expressed as Td(msec), the welding wire feed rate is expressed as vf(m/min), and the welding voltage is expressed as Vw(V), the volume of globules and the traveling period of globules become, according to FIG. 2 and FIG. 3, $$w=(\alpha 1*vf+\alpha 2)*V+(\alpha 3*vf+\alpha 4) \quad (1)$$

$$Td=(\alpha 5*vf+\alpha 6)*V+(\alpha 7*vf+\alpha 8) \quad (2)$$

($\alpha 1$, $\alpha 2$, $\alpha 3$, $\alpha 4$, $\alpha 5$, $\alpha 6$, $\alpha 7$, and $\alpha 8$ are constants)

By using formula (1) and formula (2), a welding voltage corresponding to a proper volume of globules is computed and welding is carried out.

Now, a fourth embodiment will be described. Based on the first embodiment, first, a buried arc region where arcing occurs inside a pond of weld and a region where the base metal is broken and welding is not stabilized are determined in advance through experimentation. FIG. 4 is a diagram of the aforementioned regions with a welding rate of 2.5 m/minute. A welding rate and a welding wire feed rate for carrying out desirable welding are selected so as not intrude the aforementioned regions, a welding voltage corresponding to a proper volume is computed by a formula representing the relationship between the welding wire feed rate, welding voltage, and volume of globules and a formula representing the relationship between the wire feed rate, welding voltage, and traveling period of globules, thus welding is carried out.

Now, a fifth embodiment will be described. First, traveling of globules according to the present embodiment will be described. As shown in FIG. 3, the period where globules depart from the front end of a welding wire and travel to a base metal (hereinafter, referred to as a traveling period of globules) is nearly fixed. In addition, as shown in FIG. 2, the volume of globules which depart from the front end of a welding wire and travel to a base metal (hereinafter, referred to as a volume of traveling globules) is nearly fixed. FIG. 6 are waveforms of a welding current and a welding voltage in welding according to the present invention, wherein virtually no short circuit has occurred. In short, globules formed at the front end of the welding wire are not short-circuited to the base metal and travel as shown in FIG. 7 in a nearly fixed period, indicating that stable welding has been carried out.

Where the volume of globules is provided as w(mm$^3$), the traveling period of globules is provided as Td(msec), the welding wire feed rate is provided as vf(m/min), and the welding voltage is provided as Vw(V), the volume of globules and the traveling period of globules can be expressed as:

$$w=(a*vf+b)*Vw+(c*vf+d) \quad (3)$$

$$Td=(e*vf+f)*Vw+(g*vf+h) \quad (4)$$

Herein, a, b, c, d, e, f, g, and h are constants.

Hereinafter, a case where welding is actually carried out will be described. A welding rate and a welding wire feed rate for carrying out desirable welding are selected, and a welding voltage is computed based on formula (3). At this time the voltage of globules is provided so as to become nearly fixed. The welding wire feed rate and welding rate, and the welding voltage determined by computing are set in the welding condition setting unit 1 and welding is started. Carbon dioxide gas is used as a shielding gas. In accordance with the set welding wire feed rate, the welding wire feeder 3 feeds a welding wire to a base metal, in accordance with the set welding voltage, the welding power source 2 produces arcing between the welding wire and base metal, and in accordance with the set welding rate, a welding torch shifter (unillustrated) shifts a welding torch, thus desirable welding is carried out.

Now, a sixth embodiment will be described. In the sixth embodiment, a welding wire having a welding wire diameter of 1.2 mm is used, the volume of globules is provided so as to be nearly stable in a range of 3.0 mm$^3$–4.5 mm$^3$, and a welding voltage is computed by formula (3), thus welding is carried out.

Now, a seventh embodiment will be described. Based on the sixth embodiment, if the welding rate is 2.5 m/minute, the welding wire feed rate is in a range of 18–20 m/minute, the volume of globules is in a range of 3.0 mm³–4.5 mm³, and the traveling period of globules is in a range of 9 msec–15 msec, formulae (3) and (4) become $$w=(-0.0243*vf+0.4029)*V+(1.1548*vf-15.885) \quad (5)$$

$$Td=(-0.0591*vf+0.9634)*V+(2.3245*vf-27.329) \quad (6)$$

By using these formulae (5) and (6), a welding voltage for carrying out desirable welding is computed, thus welding is carried out.

Now, an eighth embodiment will be described. Based on the fifth embodiment, if the welding rate is 2.0 m/minute, the welding wire feed rate is in a range of 15–17 m/minute, the volume of globules is in a range of 3.0 mm³–4.5 mm³, and the traveling period of globules is in a range of 10 msec–15 msec, formulae (3) and (4) become $$w=(-0.0326*vf+0.48)*V+(1.1273*vf-12.698) \quad (7)$$

$$Td=(-0.1*vf+1.4661)*V+(2.646*vf-24.736) \quad (8)$$

By using these formulae (7) and (8), a welding voltage for carrying out desirable welding is computed, thus welding is carried out.

Now, a ninth embodiment will be described. In FIG. 10, welding equipment according to the ninth embodiment is shown. A welding rate and a welding wire feed rate for carrying out desirable welding are selected, and a welding voltage corresponding to a proper volume of globules is computed by the welding voltage calculator 4. The welding wire feed rate and the welding voltage determined by computing are set in the welding condition setting unit 1, the welding rate is set in the robot controller 5, and welding is started. Carbon dioxide gas is used as a shielding gas. In accordance with the set welding wire feed rate, the welding wire feeder 3 feeds a welding wire to a base metal, in accordance with the set welding voltage, the welding power source 2 produces arcing between the welding wire and base metal, and in accordance with the set welding rate, a robot 6 controlled by the robot controller 5 shifts a welding torch, thus desirable welding is carried out.

As has been described above, according to the present invention, the following effects are provided.

(1) In high-speed $CO_2$ welding, welding is carried out by means of a welding power source having a control means for opening a short circuit at a rate of at least approximately 500 A/msec based on detection of such a short circuit, therefore, a smooth bead penetration surface shape as in MIG or MAG welding and spatters that occur during welding and scatter are extremely reduced.

(2) Welding is carried out with an input of the welding wire feed rate and welding rate by means of a welding voltage so that the volume of globules becomes nearly stable, therefore, welding involving no short circuit can be realized.

INDUSTRIAL APPLICABILITY

As in the above, the present invention is useful as a high-speed carbon dioxide gas arc welding method.

What is claimed is:

1. A high-speed carbon dioxide gas welding method by a consumable electrode which carries out welding at a welding rate of approximately 1.5 m/minute or more using a welding power source of at least approximately 500 Å/msec based on detection of such a short circuit, wherein
said welding being conducted with a welding voltage calculated by a welding voltage calculator, said calculator computing by a first formula which utilizes a welding wire feed rate, volume of globules and welding voltage and by a second formula which utilizes the welding wire feed rate, traveling period of the globules and welding voltage.

2. A high-speed carbon dioxide gas welding method as set forth in claim 1, wherein
when a welding voltage corresponding to the proper volume of globules is computed by a formula representing the relationship between the wire feed rate, welding voltage, and volume of globules and a formula representing the relationship between the wire feed rate, welding voltage, and period of globules, a welding wire having a diameter of 1.2 mm is used, the volume of globules is in a range of 3.0 mm³–4.5 mm³, and the traveling period of globules is in a range of 9 msec–12 msec.

3. A high-speed carbon dioxide gas welding method as set forth in claim 1, wherein
when a welding voltage (Vw) corresponding to the proper volume of globules is computed by a formula representing the relationship between the wire feed rate, welding voltage, and volume of globules and a formula representing the relationship between the wire feed rate, welding voltage, and period of globules, a welding wire having a diameter of 1.2 mm is used, the volume of globules (W) is in a range of 3.0 mm³–4.5 mm³, and the traveling period of globules (Td) is in a range of 9 msec–15 msec, the welding rate is approximately 2.0–2.5 m/minute, and the welding wire feed rate (Vf) is in a range of 15 m/minute–20 m/minute, a welding voltage is computed by formulae:

$$W=(\alpha 1*Vf+\alpha 2)*Vw+\alpha 3*Vf+\alpha 4$$

$$Td=(\alpha 5*Vf+\alpha 6)*Vw+\alpha 7*Vf+\alpha 8$$

($\alpha 1$, $\alpha 2$, $\alpha 3$, $\alpha 4$, $\alpha 5$, $\alpha 6$, $\alpha 7$, and $\alpha 8$ are constants.).

4. A high-speed carbon dioxide gas welding method as set forth in claim 1, wherein
when a welding voltage corresponding to the proper volume of globules is computed by a formula representing the relationship between the wire feed rate, welding voltage, and volume of globules and a formula representing the relationship between the wire feed rate, welding voltage, and period of globules, a buried arc region where arcing occurs inside a pond of weld and a region where a base metal is broken or welding is not stabilized are determined through experimentation in advance.

5. A high-speed carbon dioxide gas welding method as set forth in claim 4, wherein
where a welding wire having a diameter of 1.2 mm is used, the welding rate is approximately 2.5 m/minute, the welding wire feed rate (Vf) is in a range of 18 m/minute–20 m/minute, the volume of globules (W) is in a range of 3.0 mm³–4.5 mm³, and the traveling period of globules (Td) is in a range of 9 msec–12 msec, when a welding voltage (Vw) is computed with an input of the welding wire feed rate and welding rate so that the volume of globules becomes nearly stable, a welding voltage is computed by formulae:

$$W=(-0.0243*Vf+0.4029)*Vw+1.1548*Vf-15.885$$

$$Td=(-0.0591*Vf+0.9634)*Vw+2.3245*Vf-27.329$$

6. A high-speed carbon dioxide gas welding method as set forth in claim 4, wherein where a welding wire having a diameter of 1.2 mm is used, the welding rate is approximately 2 m/minute, the welding wire feed rate (Vf) is in a range of 15 m/minute–17 m/minute, the volume of globules (W) is in a range of 3.0 mm³–4.5 mm³, and the traveling period of globules (Td) is in a range of 10 msec–15 msec, when a welding voltage (Vw) is computed with an input of the welding wire feed rate and welding rate so that the volume of globules becomes nearly stable, a welding voltage is computed by formulae:

$$W=(-0.0326*Vf+0.48)*Vw+1.1273*Vf-12.698$$

$$Td=(-0.1*Vf+1.4661)*Vw+2.646*Vf-24.736$$

7. A high-speed carbon dioxide gas welding method as set forth in any of claims 1 through 6, wherein welding is carried out by welding equipment including a robot controller.

\* \* \* \* \*